(12) United States Patent
Cervantes

(10) Patent No.: US 10,900,529 B2
(45) Date of Patent: Jan. 26, 2021

(54) BRAKE CALIPER MOUNTING ASSEMBLY

(71) Applicant: Emilio Cervantes, Lake Forest, CA (US)

(72) Inventor: Emilio Cervantes, Lake Forest, CA (US)

(73) Assignee: Emilio Cervantes, Lake Forest, CA (US)

( * ) Notice: Subject to any disclaimer, the term of this patent is extended or adjusted under 35 U.S.C. 154(b) by 49 days.

(21) Appl. No.: 16/386,076

(22) Filed: Apr. 16, 2019

(65) Prior Publication Data

US 2020/0232529 A1 Jul. 23, 2020

Related U.S. Application Data

(60) Provisional application No. 62/793,829, filed on Jan. 17, 2019.

(51) Int. Cl.
| | |
|---|---|
| *F16D 55/22* | (2006.01) |
| *F16D 65/00* | (2006.01) |
| *F16D 65/095* | (2006.01) |
| *F16D 55/00* | (2006.01) |

(52) U.S. Cl.
CPC ....... *F16D 65/0062* (2013.01); *F16D 65/095* (2013.01); *F16D 2055/0008* (2013.01); *F16D 2055/0016* (2013.01)

(58) Field of Classification Search
CPC ..... F16D 2055/0016; F16D 2055/0008; F16D 2055/005; F16D 2055/002; F16D 2055/0025; F16D 2055/0012; F16D 65/0056; B62L 1/005
See application file for complete search history.

(56) References Cited

U.S. PATENT DOCUMENTS

| 5,282,521 A * | 2/1994 | Leist .................... F16D 55/227 |
| | | 188/73.39 |
| 6,336,526 B1 * | 1/2002 | Chou ........................ B62L 1/00 |
| | | 188/24.11 |
| 6,431,327 B2 * | 8/2002 | Lumpkin ................ B62L 1/005 |
| | | 188/24.12 |

(Continued)

FOREIGN PATENT DOCUMENTS

| JP | 2005273712 A | * | 10/2005 |
| KR | 19980031615 U | | 8/1998 |

*Primary Examiner* — Bradley T King
*Assistant Examiner* — Stephen M Bowes
(74) *Attorney, Agent, or Firm* — Knobbe, Martens, Olson & Bear, LLP

(57) ABSTRACT

Disclosed herein are embodiments of a brake caliper mounting assembly. The assembly can include a caliper bracket and support brackets which secure a brake caliper and a steering knuckle. The caliper bracket can include a top portion which secures a first arm of the brake caliper to a first lug of the steering knuckle along outward sides thereof, a bottom portion which secures a second arm of the brake caliper to a second lug of the steering knuckle along outwards sides thereof, and a stem extending between the top and bottom portions. The assembly can further include a first support bracket which secures the first arm of the brake caliper to the first lug of the steering knuckle along inward sides thereof and a second support bracket which secures the second arm of the brake caliper to the second lug of the steering knuckle along inward sides thereof.

17 Claims, 10 Drawing Sheets

(56) References Cited

U.S. PATENT DOCUMENTS

| | | | |
|---|---|---|---|
| 6,729,444 B1 | 5/2004 | Schmandt et al. | |
| 7,896,141 B2 * | 3/2011 | Baumgartner | F16D 65/568 188/73.46 |
| 8,356,701 B2 | 1/2013 | Schmandt et al. | |
| 8,469,159 B2 | 6/2013 | Lowe et al. | |
| 2002/0104719 A1 * | 8/2002 | Nakayama | F16D 65/0006 188/73.46 |
| 2008/0067015 A1 * | 3/2008 | Thomas | F16D 55/00 188/73.31 |
| 2014/0034431 A1 * | 2/2014 | Chung; I-Chao | F16D 65/0075 188/73.31 |

\* cited by examiner

BRAKE CALIPER MOUNTING ASSEMBLY

INCORPORATION BY REFERENCE TO ANY PRIORITY APPLICATIONS

This application claims priority to U.S. Provisional Application No. 62/793,829, filed Jan. 17, 2019, titled BRAKE CALIPER MOUNTING ASSEMBLY, the entirety of which is hereby incorporated by reference herein.

BACKGROUND

Field

Embodiments of the present disclosure relate to brake caliper mounting assemblies for a vehicle.

Description of the Related Art

The installation of aftermarket brake kits is common in the competitive racing community where higher performance is desired. Aftermarket brake kits typically include bigger discs/rotors and/or brake calipers, which require utilization of a caliper bracket to space the brake caliper further away from the steering knuckle of a vehicle.

SUMMARY

The systems, methods, and devices of this disclosure each have several innovative aspects, no single one of which is solely responsible for the desirable attributes disclosed herein.

In some embodiments, an assembly for an axial brake mount for an automobile comprises: a steering knuckle; a brake caliper; a caliper bracket; and a first and second support bracket. In some embodiments, the steering knuckle comprises a first lug and a second lug. In some embodiments, the caliper bracket is configured to at least partially secure the steering knuckle to the brake caliper and comprises: a top portion having a first end configured to secure to an outward side of the first lug and a second end configured to secure to an outward side of the first portion of the brake caliper; a bottom portion having a first end configured to secure to an outward side of the second lug and a second end configured to secure to an outward side of the second portion of the brake caliper; and a stem extending between the top and bottom portions, wherein the stem is configured to stabilize the top and bottom portions of the caliper bracket. In some embodiments, the first support bracket comprises a first end and a second end, wherein the first end is configured to secure to an inward side of the first lug of the steering knuckle and the second end is configured to secure to an inward side of the first portion of the brake caliper. In some embodiments, the second support bracket comprises a first end and a second end, wherein the first end is configured to secure to an inward side of the second lug of the steering knuckle and the second end is configured to secure to an inward side of the second portion of the brake caliper.

In some embodiments, when the caliper bracket and the first and second support brackets are secured to the steering knuckle and the brake caliper, an inward face of the first end of the top portion of the caliper bracket abuts the outward side of the first lug of the steering knuckle and an inward face of the second end of the top portion abuts the outward side of the first portion of the brake caliper. In some embodiments, when the caliper bracket and the first and second support brackets are secured to the steering knuckle and the brake caliper, an inward face of the first end of the bottom portion of the caliper bracket abuts the outward side of the second lug of the steering knuckle and an inward face of the second end of the bottom portion abuts the outward side of the second portion of the brake caliper. In some embodiments, when the caliper bracket and the first and second support brackets are secured to the steering knuckle and the brake caliper, an outward face of the first end of the first support bracket abuts the inward side of the first lug of the steering knuckle and an outward face of the second end of the first support bracket abuts the inward side of the first portion of the brake caliper. In some embodiments, when the caliper bracket and the first and second support brackets are secured to the steering knuckle and the brake caliper, an outward face of the first end of the second support bracket abuts the inward side of the second lug of the steering knuckle and an outward face of the second end of the second support bracket abuts the inward side of the second lug of the second portion of the brake caliper.

In some embodiments, the first end of the top portion of the caliper bracket has a first thickness, the first lug of the steering knuckle has a second thickness, the first end of the first support bracket has a third thickness, the second end of the top portion of the caliper bracket has a fourth thickness, the first portion of the brake caliper has a fifth thickness, and the second end of the first support bracket has a sixth thickness. In some embodiments, a sum of the first, second, and third thicknesses is within 15% of a sum of the fourth, fifth, and six thicknesses. In some embodiments, the sum of the first, second, and third thicknesses is within 10% of the sum of the fourth, fifth, and six thicknesses. In some embodiments, the first thickness of the first end of the top portion of the caliper bracket is greater than the fourth thickness of the second end of the top portion of the caliper bracket. In some embodiments, the third thickness of the first end of the first support bracket is greater than the sixth thickness of the second end of the first support bracket.

In some embodiments, the first end of the bottom portion of the caliper bracket has a seventh thickness, the second lug of the steering knuckle has an eighth thickness, the first end of the second support bracket has a ninth thickness, the second end of the bottom portion of the caliper bracket has a tenth thickness, the second portion of the brake caliper has a eleventh thickness, and the second end of the first support bracket has a twelfth thickness. In some embodiments, a sum of the seventh, eighth, and ninth thicknesses is within 15% of a sum of the tenth, eleventh, and twelfth thicknesses. In some embodiments, the sum of the seventh, eighth, and ninth thicknesses is within 10% of the sum of the tenth, eleventh, and twelfth thicknesses. In some embodiments, the seventh thickness of the first end of the bottom portion is less than the tenth thickness of the second end of the bottom portion. In some embodiments, the ninth thickness of the first end of the second support bracket is less than the twelfth thickness of the second end of the support bracket.

In some embodiments, the brake mount assembly is configured such that: the first portion of the brake caliper has a through-hole and the second portion of the brake caliper has a through-hole; the first lug of the steering knuckle has a through-hole and the second lug of the steering knuckle has a through-hole; the first end of the top portion has a through-hole aligned with the through-hole of the first lug of the steering knuckle and the second end of the top portion of the caliper bracket has a through-hole aligned with the through-hole of the first portion of the brake caliper; the first end of the first support bracket has a through-hole aligned with the through-hole of the first lug of the steering knuckle and the second end of the first support bracket has a through-hole aligned with the through-hole of the first portion of the brake caliper; a first bolt extends through the through-hole of the first end of the top portion of the caliper bracket, the through-hole of the first lug of the steering knuckle, and the through-hole of the first end of the first support bracket; and a second bolt extends through the through-hole of the second end of the top portion of the caliper bracket, the through-hole of the first portion of the brake caliper, and the through-hole of the second end of the first connector; and the first and second bolts cooperate to straddle the first portion of the brake caliper and the first lug of the steering knuckle to reduce stresses arising from the brake caliper moving in a direction away from a rotor of the automobile. In some embodiments, an opening is defined between the top portion of the caliper bracket, the first support bracket, the first portion of the brake caliper, and the first lug of the steering knuckle. In some embodiments, the brake mount assembly is further configured such that: the first end of the bottom portion has a through-hole aligned with the through-hole of the second lug of the steering knuckle and the second end of the bottom portion of the caliper bracket has a through-hole aligned with the through-hole of the second portion of the brake caliper; the first end of the second support bracket has a through-hole aligned with the through-hole of the second lug of the steering knuckle and the second end of the second support bracket has a through-hole aligned with the through-hole of the second portion of the brake caliper; a third bolt extends through the through-hole of the first end of the bottom portion of the caliper bracket, the through-hole of the second lug of the steering knuckle, and the through-hole of the first end of the second support bracket; and a fourth bolt extends through the through-hole of the second end of the bottom portion of the caliper bracket, the through-hole of the second portion of the brake caliper, and the through-hole of the second end of the second connector. In some embodiments, an opening is defined between the bottom portion of the caliper bracket, the second support bracket, the second portion of the brake caliper, and the second lug of the steering knuckle.

In some embodiments, the stem of the caliper bracket is curved away from the steering knuckle. In some embodiments, the first and second portions of the brake caliper are positioned closer to a rotor of the automobile than the first and second lugs of the steering knuckle so as to allow one or more brake pads housed within the brake caliper to contact a surface of the rotor.

In some embodiments, a method of stiffening a brake assembly for an automobile comprises: providing a steering knuckle comprising a first lug and a second lug; providing a brake caliper; positioning a first portion of a first bracket proximate to a first portion of the brake caliper and positioning a second portion of the first bracket adjacent to the first lug of the steering knuckle so that an inward face of the second portion of the first bracket abuts an outward side of the first lug; positioning a first portion of a first support bracket adjacent to the first lug of the steering knuckle so that an outward face of the first portion of the first support bracket abuts an inward side of the first lug; and inserting a first fastener through: a hole in the first portion of the first support bracket; a hole in first lug of the steering knuckle; and a hole in the second portion of the first bracket.

In some embodiments, securing the first portion of the first bracket to the first portion of the brake caliper by securing a second fastener to an end of the first portion of the first bracket and to a through-hole in the first portion of the brake caliper, wherein the through-hole of the first portion of the brake caliper extends through a thickness of the brake caliper in a direction generally parallel to a face of a brake rotor of the brake assembly. In some embodiments, the method further comprises securing a second portion of the first support bracket to a third portion of the first bracket with a second fastener, wherein the second fastener is configured to pass through a hole in the second portion of the first support bracket and secure within a hole in the third portion of the first bracket.

In some embodiments, the first bracket comprises an I-shaped caliper bracket having a top portion, a bottom portion, and a stem extending between the top and bottom portions, the first portion of the first bracket comprising a first end of the top portion. In some embodiments, securing the first portion of the first bracket to the first portion of the brake caliper comprises securing the first end of the top portion to a first portion of the brake caliper so that an inward face of the first end of the top portion abuts an outward face of the first portion of the brake caliper, the first portion of the brake caliper comprising a through-hole configured to align with a through-hole in the first end of the top portion.

In some embodiments, the method further comprises securing a second portion of a first support bracket to the first portion of the brake caliper so that an outward face of the second portion of the first support bracket abuts an inward side of the first portion of the brake caliper, the second portion of the first support bracket comprising a through-hole configured to align with the through-hole in the first portion of the brake caliper. In some embodiments, when the first end of the top portion is secured to a first portion of the brake caliper and the second portion of the first support bracket is secured to the first portion of the brake caliper, a second fastener extends through: the through-hole in the first end of the top portion of the first bracket; the through-hole of the first portion of the brake caliper; and the through-hole in the second portion of the first support bracket.

DETAILED DESCRIPTION

Disclosed herein are embodiments of brake caliper mounting assemblies for automobiles. However, while this disclosure discusses brake caliper mounting assemblies primarily in relation to automobiles, the assemblies, methods, and/or components discussed herein can be used for other apparatus, such as in airplanes and railway brakes. In some embodiments, the brake caliper mounting assemblies can allow a steering knuckle to be secured and supported on both sides (for example, inward and outward sides of lugs of the steering knuckle), which increases the rigidity of the connection. In some embodiments, the brake caliper mounting assembly can minimize flexing of the steering knuckle-brake caliper connection and components thereof (such as the brake caliper). This can reduce the likelihood of uneven brake forces and uneven distributions of heat along the brake-rotor interface, which can in turn reduce uneven break wear. The increased rigidity provided by the disclosed brake caliper mounting assemblies can also increase sensitivity and precision in braking, which can be significantly valuable in competitive driving environments.

Axial-Mount Brake Assembly

Figure 1:
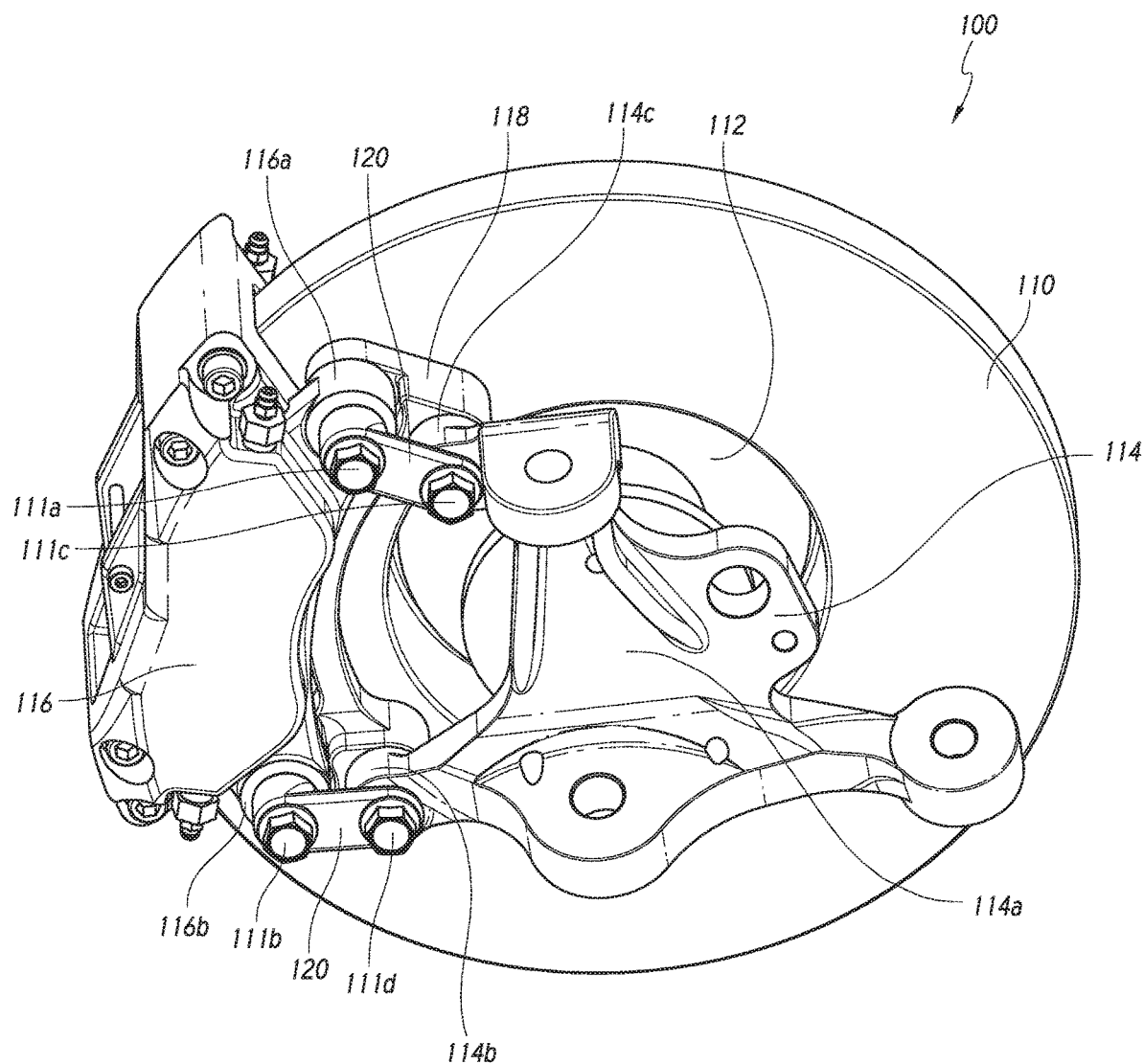
FIG. 1 illustrates a perspective view of an embodiment of an axial-mount brake assembly.

FIG. 1 illustrates a perspective view of an axial-mount brake assembly 100 for mounting a brake caliper 116 to a steering knuckle 114 of a vehicle. The phrase "axial-mount brake assembly" or "axially mounted" means that the caliper bolts 111a, 111b which secure to the brake caliper 116 are angled at approximately 90 degrees in relation to a surface of the rotor 110. As shown in FIG. 1, brake caliper 116 is mounted to the steering knuckle 114 via caliper bracket 118 and support brackets 120 with bolts 111a, 111b, 111c, 111d which extend through holes in the brake caliper 116, steering knuckle 114, caliper bracket 118, and support brackets 120.

Figure 2A:
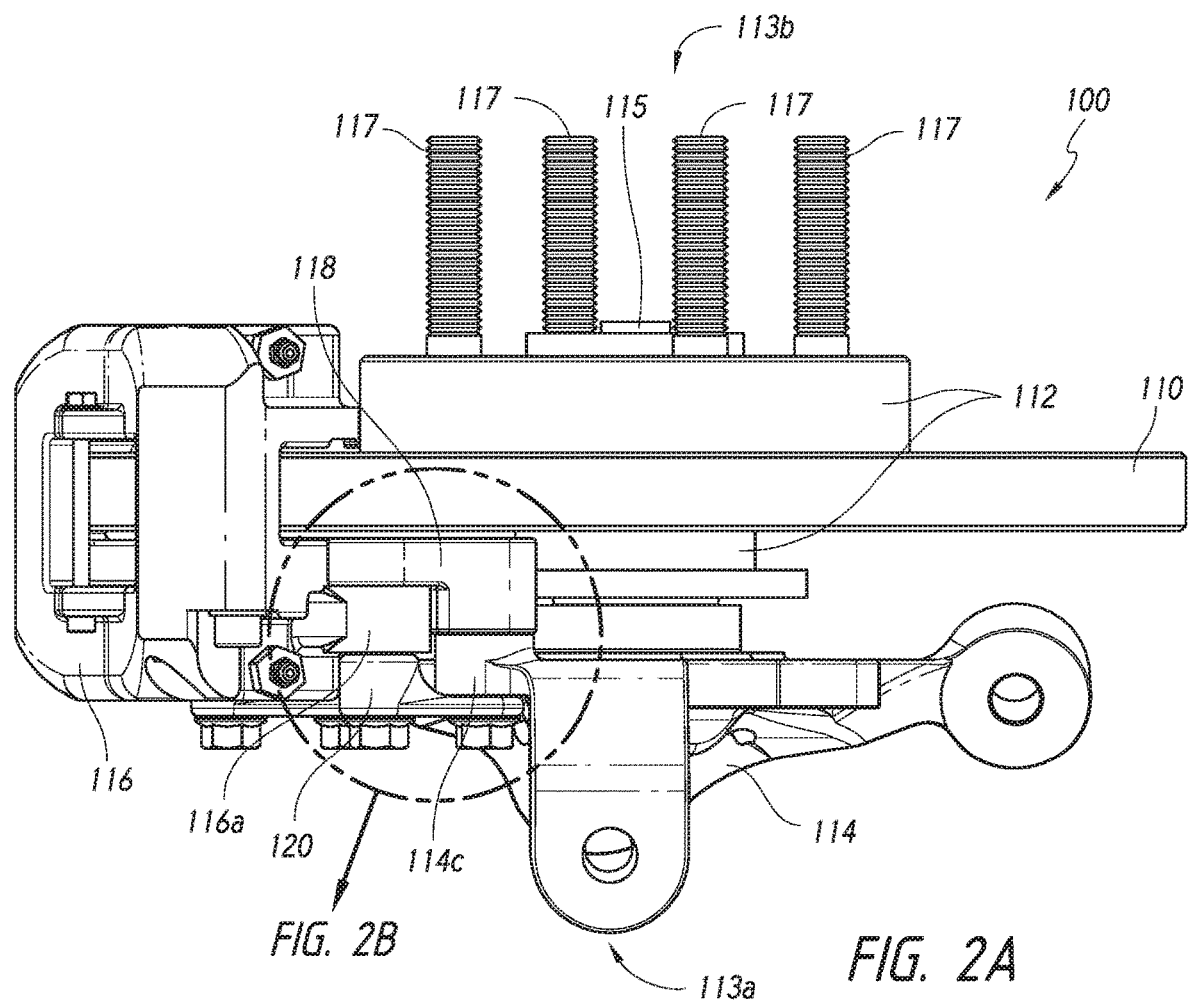
FIG. 2A illustrates a top view of the axial-mount brake assembly of FIG. 1.

FIG. 1 illustrates a view of an inward-facing side 113a of the assembly 100 (i.e., a side of the assembly 100 facing towards the vehicle) (see FIG. 2A. FIG. 2A illustrates a top view of the brake assembly 100 and shows an outward-facing side 113b of the assembly 100 which faces away from the vehicle. As shown in FIG. 2A, the steering knuckle 114 can have a spindle 115 (see FIGS. 2A, 9, and 10) extending generally perpendicularly from a main body 114a (and away from the vehicle; see FIGS. 2A and 1) of the steering knuckle 114. The spindle 115 can insert through a hub/bearing assembly 112. The hub/bearing assembly 112 can include studs 117 which can pass through holes in a wheel and be secured to the wheel as is known to one of ordinary skill in the art. Although not shown, the brake caliper 116 typically houses brake pads which can engage surfaces of the rotor 110. Steering knuckle 114 can have one or more lugs that allow the brake caliper 116 to be secured thereto. For example, steering knuckle 114 can have a first lug 114c and a second lug 114b (see FIG. 1). As shown, the first lug 114c can be vertically higher than the second lug 114b (with respect to the orientation of the brake assembly 100 as shown in FIG. 1).

Figure 2B:
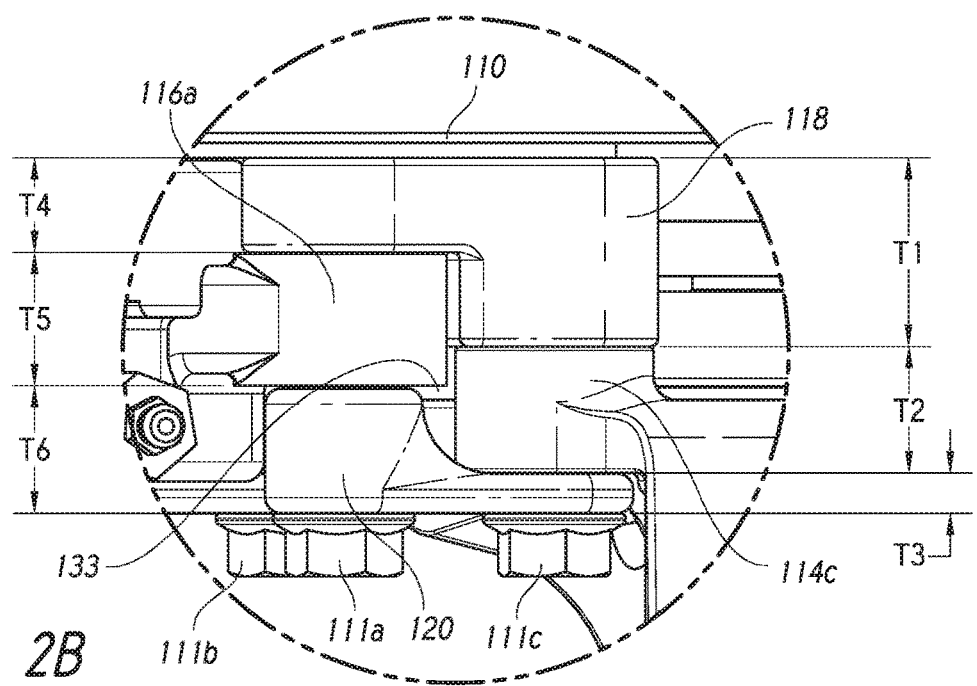
FIG. 2B illustrates an enlarged view of a portion of the top view of FIG. 2A.
Figure 3:
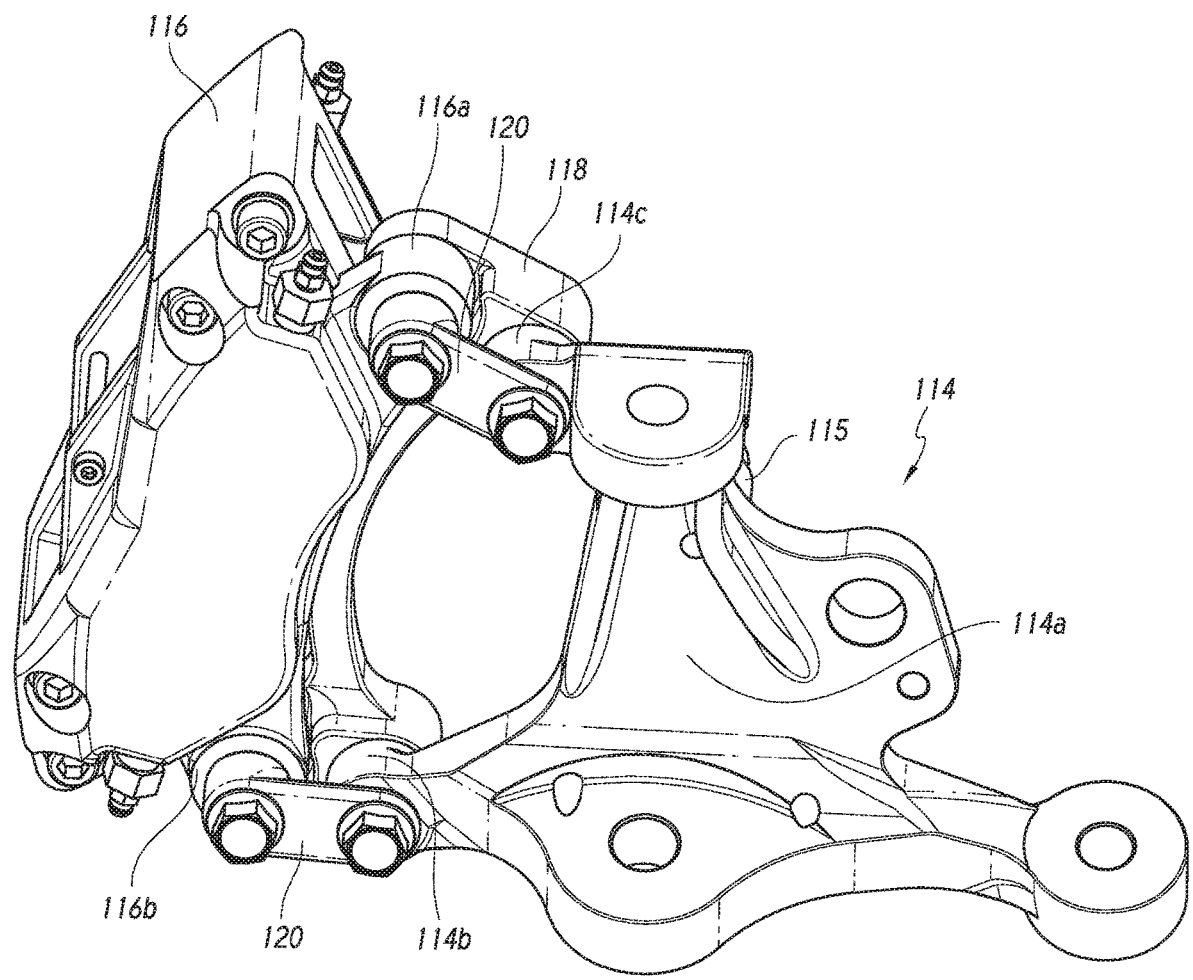
FIG. 3 illustrates another perspective view of the axial-mount brake assembly of FIG. 1.

Brake caliper 116 can have one or more arms extending outward from the brake caliper 116. For example, brake caliper 116 can have a first arm 116a extending from a top of the brake caliper 116 (see FIG. 1). Additionally or alternatively, brake caliper 116 can have a second arm 116b extending from a bottom portion of the brake caliper 116 (see FIG. 1). The first arm 116a can be located vertically higher than the second arm 116b when the brake caliper 116 is oriented as shown in FIGS. 1-3 when the brake caliper 116 is secured to the steering knuckle 114. It will be understood that in the illustrated embodiment the first and second arms 116a, 116b have through-holes sized and shaped to receive bolts, such as bolts 111a, 111b.

Figure 4:
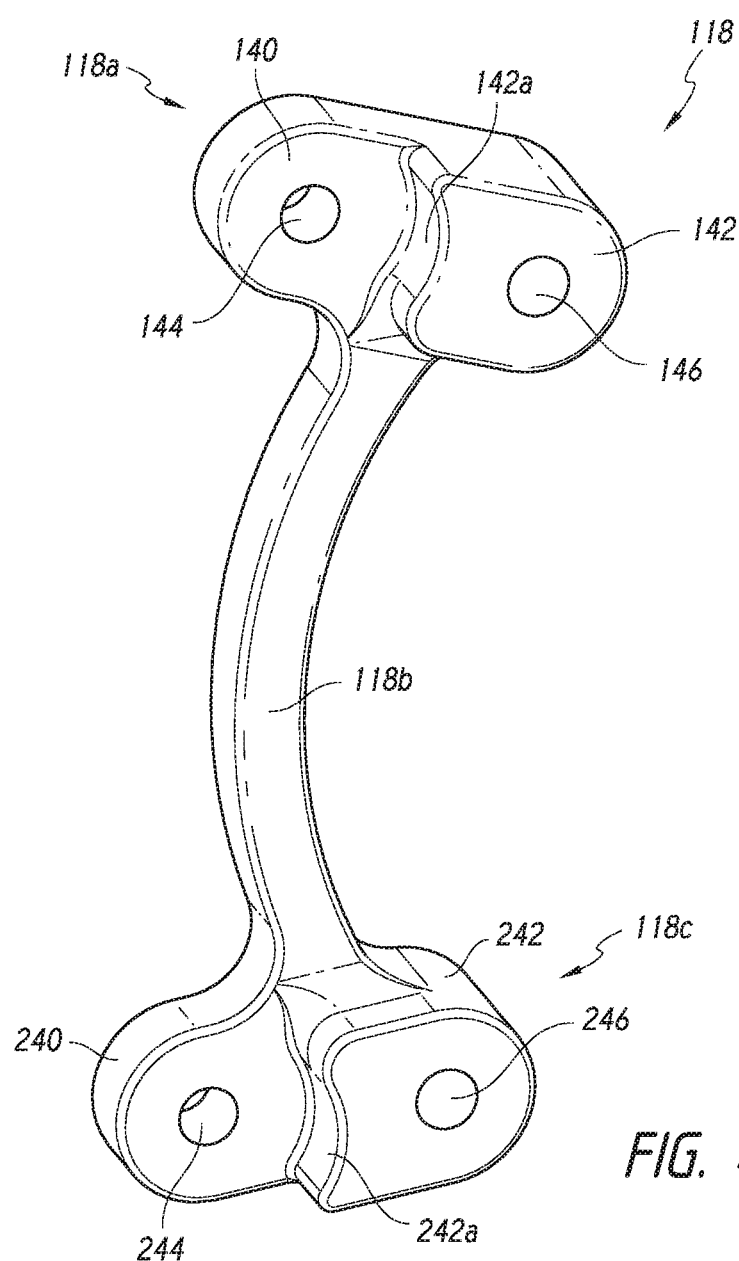
FIG. 4 illustrates an embodiment of a caliper bracket of the axial-mount assembly of FIG. 1.
Figure 5:
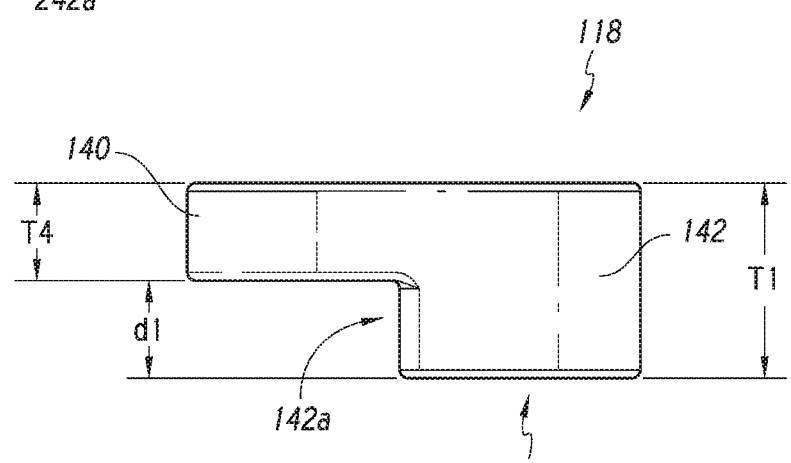
FIG. 5 illustrates a top view of the caliper bracket of FIG. 4.

As shown in FIG. 1, brake caliper 116 can be mounted to steering knuckle 114 with the utilization of a caliper bracket (such as caliper bracket 118) one or more support brackets 120, and one or more bolts (such as bolts 111a-111d). Caliper bracket 118 can be I-shaped or partially I-shaped. For example, with reference to FIGS. 4 and 5, caliper bracket 118 can include a top portion 118a, bottom portion 118c, and a stem 118b extending between the top and bottom portions 118a, 118c, which can stabilize the top and bottom portions 118a, 118c of the caliper bracket 118. Top portion 118a can have a first end 140 and a second end 142. First end 140 can be secured to an outward face of the first arm 116a of brake caliper 116 (see FIG. 3). First end 140 can have a through-hole 144 which can align with a through-hole in the first arm 116a and can be sized and shaped to receive a fastener, such as bolt 111a. When secured to the first arm 116a, an inward face of the first end 140 of the top portion 118a can abut the outward face of the first arm 116a. As used herein, an "inward face" or "inward facing side" refers to a face or surface that faces a direction toward the vehicle, and an "outward face" or "outward facing side" refs to a face or surface that faces away from the vehicle. The second end 142 of the top portion 118a of the caliper bracket 118 can be secured to an outward face of the first lug 114c of steering arm 114 (see FIG. 3). Second end 142 can have a through-hole 146 which can align with a through-hole in the first lug 114c and can be sized and shaped to receive a fastener, such as bolt 111c. When secured to the first lug 114c of the steering arm 114, an inward face of the second end 142 of the top portion 118a can abut an outward face of the first lug 114c. As shown in FIG. 4, the first and second ends 140, 142 of the top portion 118a can meet proximate to a region where stem 118b intersects top portion 118a. First and second ends 140, 142 can be rounded and/or curved, as shown in FIG. 4. First end 140 has a thickness T4 that is smaller than a thickness T1 of the second end 142, as shown in FIGS. 2B and 5. As shown in FIGS. 4 and 5, second end 142 has a side 142a at a location of the top portion 118a that transitions to the first end 140. Side 142a has a thickness dl, which also represents the difference between the thickness of the first end 140 and the thickness of the second end 142. Side 142a can be curved (for example, as shown in FIG. 4). Side 142a can be advantageously curved to accommodate a portion of the first arm 116a of brake caliper 116, as shown in FIG. 3, for example. Such curvature of side 142a can allow the first arm 116a of brake caliper 116 to be positioned closer to the first lug 114c of the steering knuckle 114, which can advantageously reduce bending or flexure-induced stresses arising when the brake pads of the brake caliper engage the rotor 110, as discussed above.

As shown in FIG. 4, stem 118b can be curved. For example, stem 118b can be curved outward toward brake caliper 116 when caliper bracket 118 is secured thereto (See FIG. 3). Such curvature advantageously reduces stresses arising in the caliper bracket 118 when the brake assembly 100 is in use.

The differential thickness dl between thickness T4 of the first end 140 and thickness T1 of the second end 142 (see FIG. 5) can allow the first arm 116a of the brake caliper 116 to be positioned closer to the rotor 110 when secured to the first lug 114c of the steering knuckle 114. For example, with reference to FIG. 2A, when the brake caliper 116 is secured to the steering arm 114 in the configuration shown, the first arm 116a of the brake caliper 116 can be positioned a distance from a surface of the rotor 110 that is smaller than a distance that the first lug 114c is spaced from the rotor 110. This can advantageously allow brake pads within the brake caliper 116 to better engage the surfaces of the rotor 110.

Bottom portion 118c of caliper bracket 118 can have a first end 240 and a second end 242. First end 240 can be secured to an outward face of the second arm 116b of brake caliper 116. First end 240 can have a through-hole 244 which can align with a through-hole in the second arm 116b and can be sized and shaped to receive a fastener, such as bolt 111b. When secured to the second arm 116b, an inward face of the first end 240 of the bottom portion 118c can abut the outward face of the second arm 116b. The second end 242 of the bottom portion 118c of the caliper bracket 118 can be secured to an outward face of the second lug 114b of steering arm 114 (see FIG. 3). Second end 242 can have a through-hole 246 which can align with a through-hole in the second lug 114b and can be sized and shaped to receive a fastener, such as bolt 111d. When secured to the second lug 114b of the steering arm 114, an inward face of the second end 242 of the bottom portion 118c can abut an outward face of the second lug 114b (see FIG. 3).

First and second ends 240, 242 can be rounded and/or curved, as shown in FIG. 4. As shown in FIG. 4, the first and second ends 240, 242 of the bottom portion 118c can meet proximate to a region where stem 118b intersects bottom portion 118c. First end 240 can have a thickness that is equal to the thickness T4 of the first end 140 of the top portion 118a. Second end 242 can have a thickness that is equal to the thickness T1 of the second end 142 of the top portion 118a. The thickness of the first end 240 can be smaller than the thickness of the second end 242, as shown in FIG. 4. As shown in FIG. 4, second end 242 has a side 242a at location of the bottom portion 118c that transitions to the first end 240. Side 242a has a thickness which also represents the difference between the thickness of the first end 240 and the thickness of the second end 242. The difference between the thicknesses of the first and second ends 240, 242 of the bottom portion 118c can be the same as the differential thickness dl between the thicknesses of the first and second ends 140, 142 of the top portion 118a. Side 242a can be curved (for example, as shown in FIG. 4). Side 242a can advantageously be curved to accommodate a portion of the second arm 116b of brake caliper 116, as shown in FIG. 3, for example. Such curvature of side 242a can allow the second arm 116b of brake caliper 116 to be positioned closer to the second lug 114b of the steering knuckle 114, which can advantageously reduce bending or flexure-induced stresses arising when the brake pads of the brake caliper engage the rotor 110.

The differential thickness between the thickness of the first end 240 and the thickness of the second end 242 can allow the second arm 116b of the brake caliper 116 to be positioned closer to the rotor 110 when secured to the second lug 114b of the steering knuckle 114. For example, similar to that discussed with reference to first arm 116a, the top portion 118a of caliper bracket 118m and first lug 114c above and FIG. 2B, when the brake caliper 116 is secured to the steering arm 114 in the configuration shown, the second arm 116b of the brake caliper 116 can be positioned a distance from a surface of the rotor 110 that is smaller than a distance that the second lug 114c is spaced from the rotor 110. This can advantageously allow brake pads within the brake caliper 116 to better engage the surfaces of the rotor 110.

Figure 6:
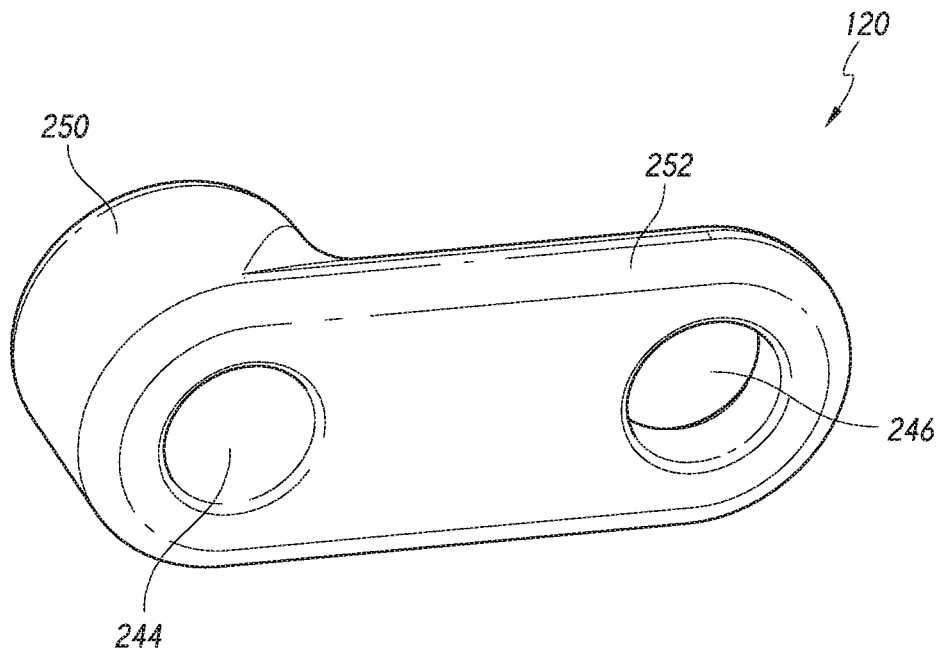
FIG. 6 illustrates an embodiment of a support bracket of the axial-mount assembly of FIG. 1.
Figure 7:
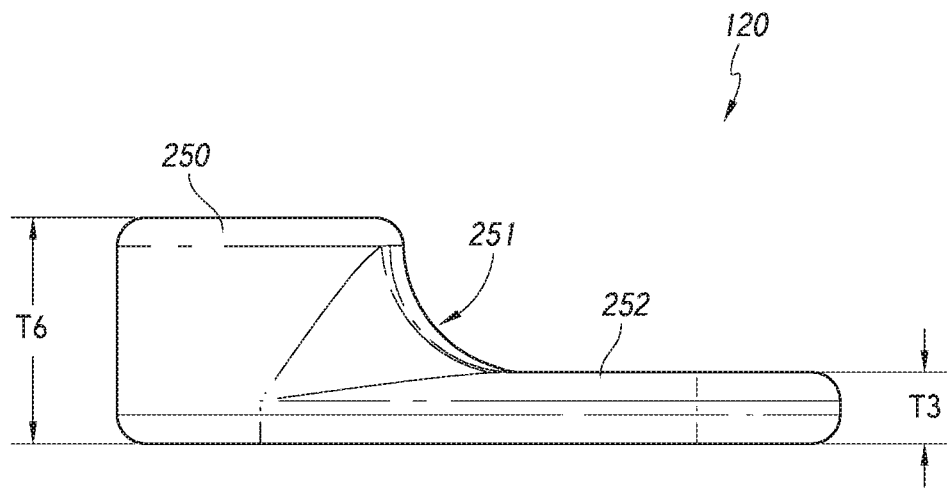
FIG. 7 illustrates a top view of the support bracket of FIG. 6.

FIGS. 6 and 7 illustrate support bracket 120 that can be used in the brake assembly 100. As shown by FIGS. 1-3, support bracket 120 can be used alongside the caliper bracket 118 to secure the brake caliper 116 to the steering arm 114. More specifically, support bracket 120 can be used to secure the first arm 116a of the brake caliper 116 to the first lug 114c of the steering arm 113 and/or the second arm 116b of the brake caliper 116 to the second lug 114b of the steering arm 114. In some embodiments, a first support bracket 120 secures the first arm 116a of the brake caliper 116 to the first lug 114c of the steering knuckle 114 (along with top portion 118a of caliper bracket 118) and a second support bracket 120 secures the second arm 116b of the brake caliper 116 to the second lug 114b of the steering arm 114 (along with bottom portion 118c of caliper bracket 118).

With reference to FIGS. 6-7, support bracket 120 includes a first end 250 and a second end 252. The first end 250 has a thickness T6 and the second end 252 has a thickness T3 (see FIGS. 2B and 7). Thickness T6 of the first end 250 is greater than thickness T3 of the second end 252. As shown in FIG. 6, support bracket 120 can include one or more through-holes which align with through-holes in the brake caliper 116, steering knuckle 114, and caliper bracket 118. For example, in the embodiment shown in FIG. 6, support bracket 120 includes through-holes 244 and 246. Through-hole 244 extends through the first end 250 of the support bracket 120, and through-hole 246 extends through the second end 252 of the support bracket 120. The thickness of the support bracket 120 can transition from thickness T6 to the thickness T3 at a transition region 251. As shown in FIG. 7, the transition region 251 can be curved so as to create a gradual thickness transition, which can advantageously reduce stress concentrations when the support bracket 120 secures the brake caliper 116 to the steering knuckle 114 and transfers forces arising from brake action, such as forces resulting when brake pads within the brake caliper 116 engage the rotor 110.

As also shown in FIGS. 6-7, the perimeter of the support bracket 120 can be rounded. The first end 250 of the support bracket 120 can define a cylindrical shape. Through-holes 244, 246 can be sized and shaped to receive a fastener, such as bolts 111a-111d. When securing the first arm 116a of the brake caliper 116 to the first lug 114c of the steering arm 113 and/or the second arm 116b of the brake caliper 116 to the second lug 114b of the steering arm 114, the through-holes 244, 246 of the support bracket(s) 120 can align with through-holes in the first and second arms 116a, 116b of the brake caliper 116, first and second lugs 114b, 114c of the steering knuckle 114, and first and second ends 140, 142, 240, 242 of the top and bottom portions 118a, 118c of the caliper bracket 118 (see FIG. 3).

FIGS. 2A-2B illustrate how the first and second arms 116a, 116b of the brake caliper 116 can be secured to the first and second lugs 114c, 114b of the steering knuckle 114 using the caliber bracket 118 and the support brackets 120. While FIGS. 2A-2B show the securement between the first arm 116a, the first lug 114c, the top portion 118a of the caliper bracket 118, and a first support bracket 120 at a top portion of the assembly 100, the securement and configuration is equally applicable to demonstrate the securement between the second arm 116b of the brake caliper 116, the second lug 114*b*, the bottom portion 118*c* of the caliper bracket 118, and a second support bracket 120 at a bottom portion of the assembly 100.

As shown in FIGS. 2A-2B, the top portion 118*a* of the caliper bracket 118 secures the first arm 116*a* of the brake caliper 116 and the first lug 114*c* of the steering knuckle 114. However, if the caliper bracket 118 is used by itself in such securement configuration, undesirable flexure can arise between the first arm 116*a* and the first lug 114*c*. For example, when the brake pads within the brake caliper 116 engage the rotor 110, the rotor 110 exerts a force on the brake pads (and in turn, the brake caliper 116) generally perpendicular to a surface of the rotor 110. Such force is in turn transferred by the first arm 116*a* to the first lug 114*c* via the top portion 118*a* of the caliper bracket 118. As can be seen, such force can cause bending/flexure at the interface between the first arm 116*a*, top portion 118*a*, and first lug 114*c*. Such flexure can result in uneven engagement of the brake pads of the brake caliper 116 on the rotor 110 and/or uneven distributions of heat along the brake pad-rotor interface, which can in turn reduce uneven break wear.

Advantageously, support bracket 120 secures the first arm 116*a* of the brake caliper 116 and the first lug 114*c* of the steering knuckle 114 and abuts inward facing surfaces thereof. The utilization of the support bracket 120 in such configuration advantageously reduces and/or eliminates such undesirable flexure resulting from utilization of the caliper bracket 118 alone to secure the first arm 116*a* to the first lug 114*c*. The support bracket 120 increases the overall rigidity of the brake caliper-steering knuckle interface which can increase sensitivity and precision in braking. Such increased braking sensitivity can be significantly valuable in competitive driving environments, for example.

As shown by FIG. 2B, the support bracket 120 can be used alongside the caliper bracket 118 to form a frame at the brake caliper-steering knuckle interface. For example, the thicknesses of the top portion 118*a* and the support bracket 120 can be selected so as to create a generally square-shape frame when the top portion 118*a* of the caliper bracket 118 and the support bracket 120 are secured to the first arm 116*a* and the first lug 114*c*. With reference to FIGS. 2B, 4, and 6, a combined thickness or sum of thickness T1 (of the second end 142 of the top portion 118*a* of the caliper bracket 118), thickness T2 (the thickness of the first lug 114*c*), and thickness T3 (of the second end 252 of the support bracket 120) can be equal to or within a percentage of a combined thickness or sum of thickness T4 (of the first end 140 of the top portion 118*a* of the caliper bracket 118), thickness T5 (the thickness of the first arm 116*a*), and thickness T6 (of the first end 250 of the support bracket 120). In some embodiments, the combined thickness T1-T3 is within 40%, 30%, 20%, 10%, or 5% of the combined thickness T4-T6. Additionally, the distance between the through-holes 144, 146 of the top portion 118*a* of the caliper bracket 118 can be equal to the distance between the through-holes 244, 246 of the support bracket 120, so that through-holes 144, 244 align and so that through-holes 146, 246 align. As can be seen from FIG. 2B, when the first arm 116*a* is secured to the first lug 114*c* via the top portion 118*a* of the caliper bracket 118 and the support bracket 120, a gap or opening 133 can be defined between surfaces of the components.

Radial-Mount Brake Assembly

Figure 8:
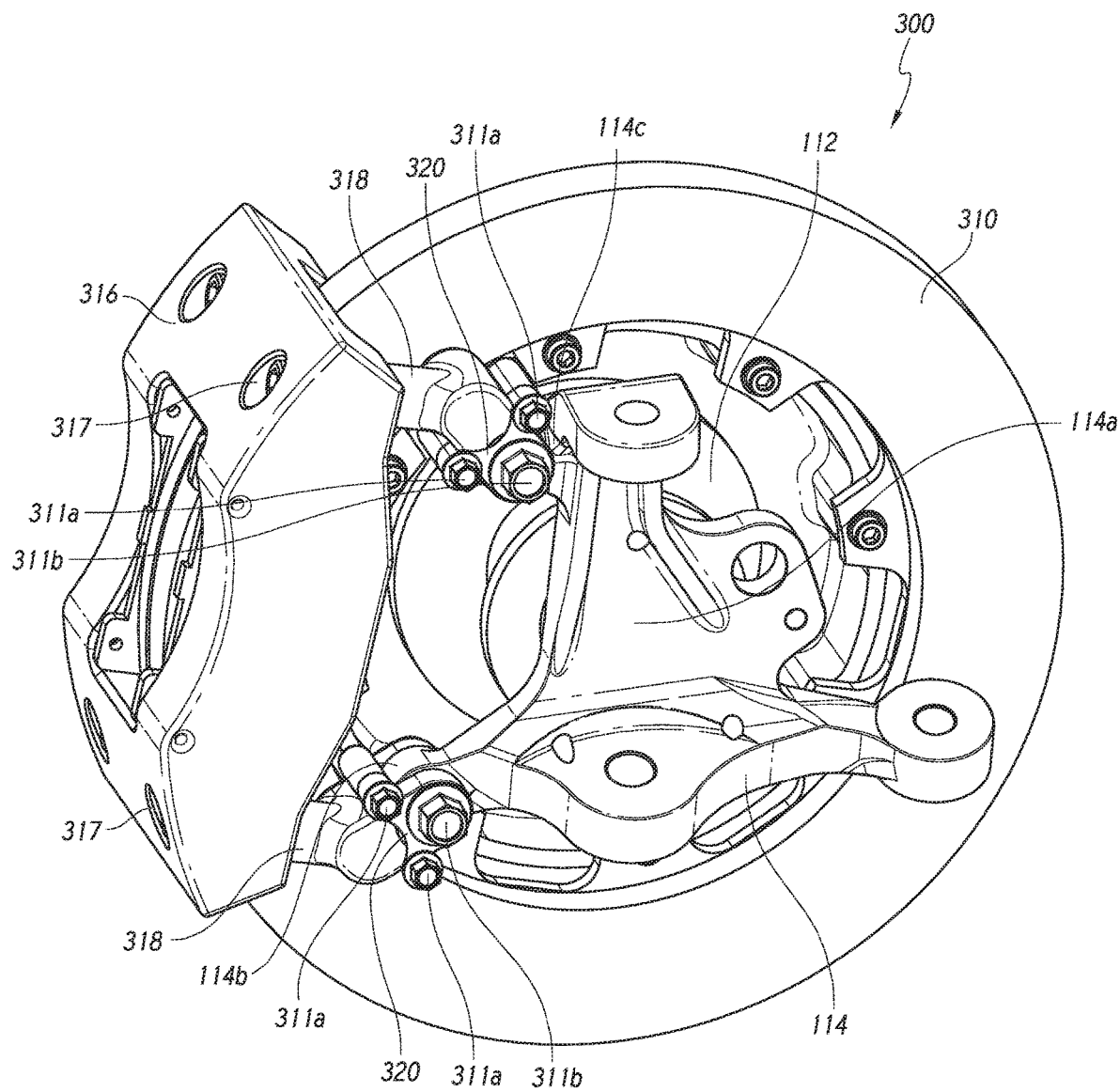
FIG. 8 illustrates a perspective view of an embodiment of a radial-mount brake assembly.
Figure 9:
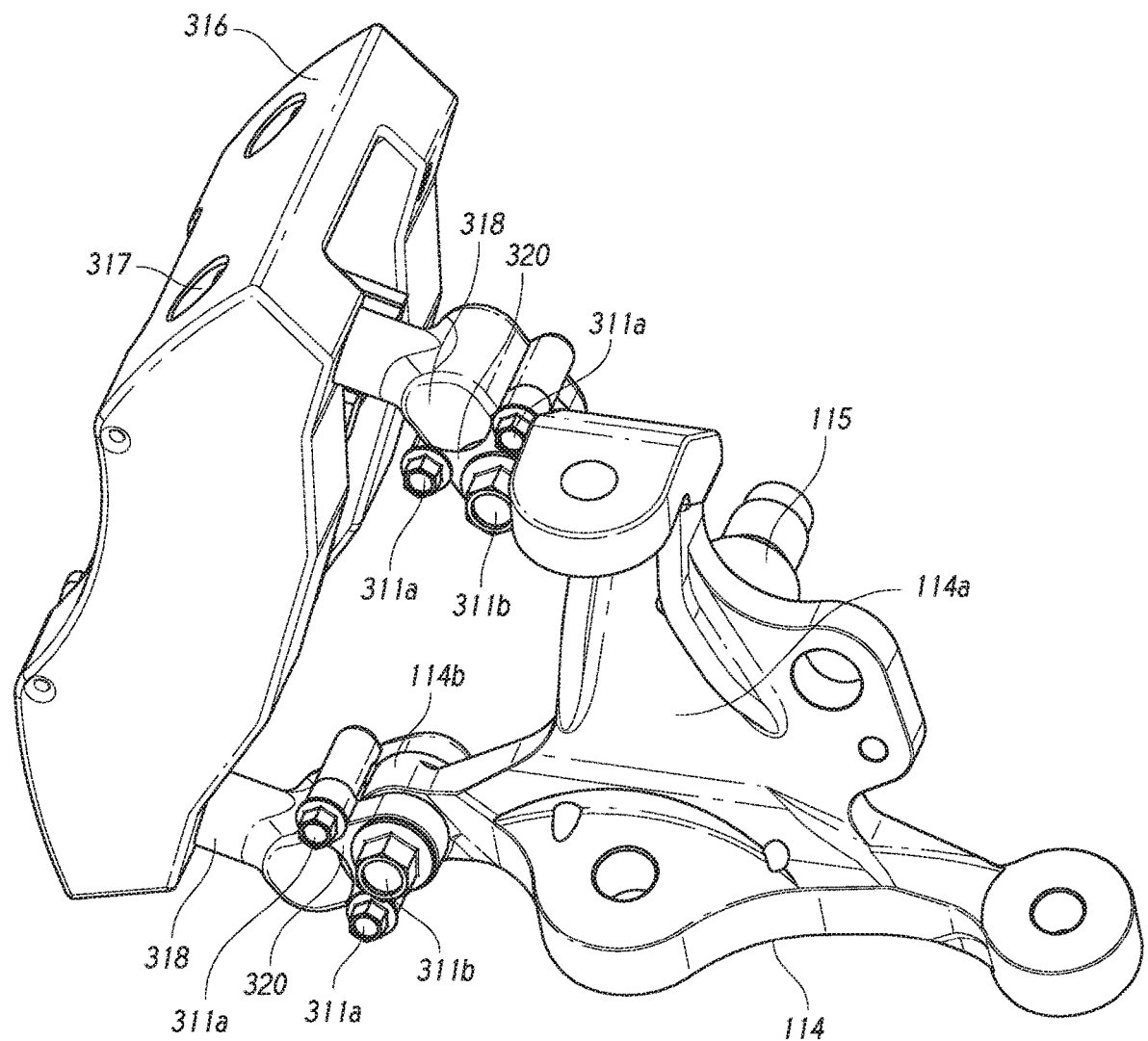
FIG. 9 illustrates another perspective view of the radial-mount brake assembly of FIG. 8.
Figure 10:
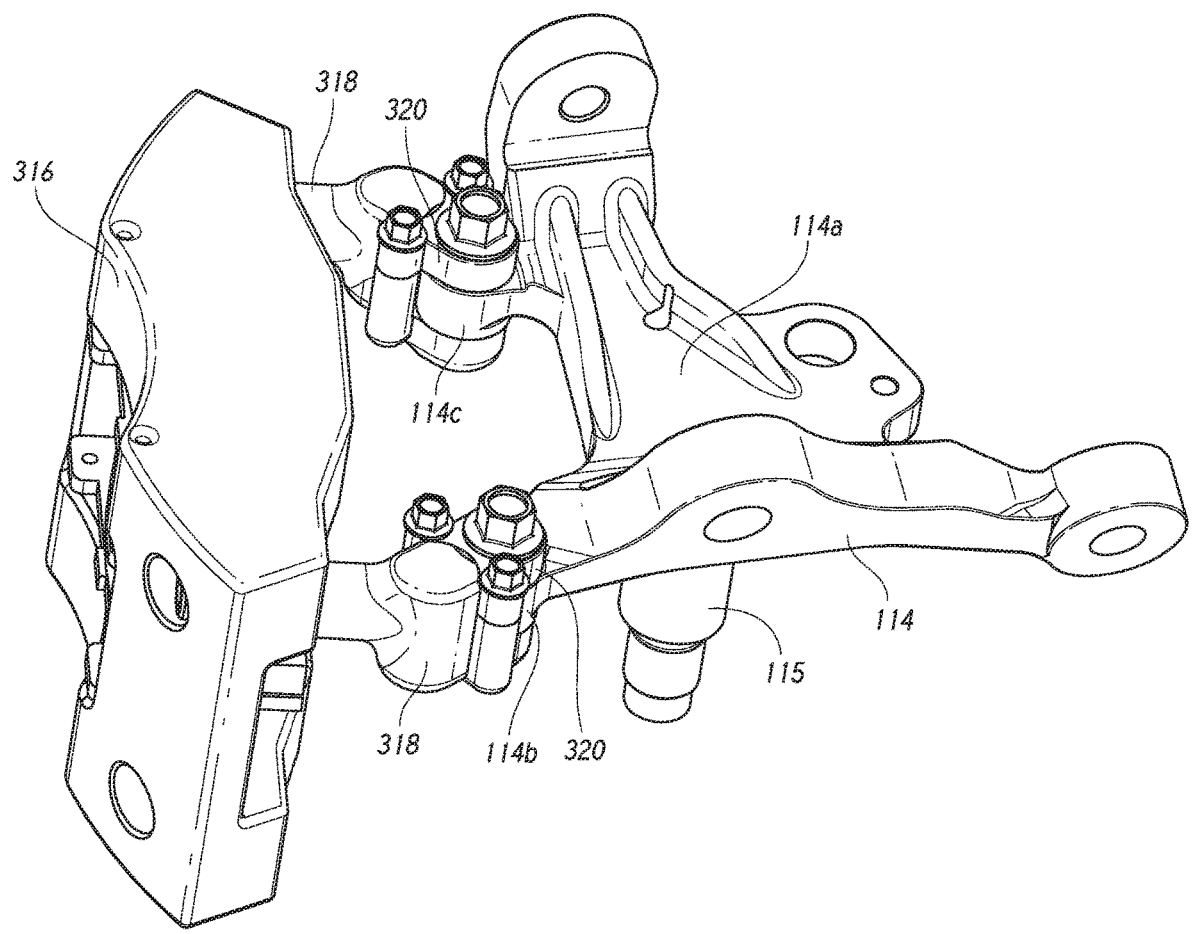
FIG. 10 illustrates another perspective view of the radial-mount brake assembly of FIG. 8.

FIGS. 8-10 illustrate perspective views of a radial-mount brake assembly 300 for mounting a brake caliper 316 to a steering knuckle 114 of a vehicle. The phrase "radial-mount brake assembly" or "radially mounted" means that an axis running through each of the caliper bolts which secure to the brake caliper 316 is generally parallel to a surface of the rotor 310. As shown, caliper bolts secure to first ends 340 of caliper brackets 318 and secure within threaded holes 317 in brake caliper 318 in a direction/orientation generally parallel to a surface of rotor 310 (see FIGS. 8 and 12). As also shown in FIG. 8, brake caliper 316 is mounted to the steering knuckle 114 via caliper bracket 318 and support brackets 320 with bolts 311*b* which extend through holes in the caliper bracket 318, steering knuckle 114, and support brackets 320. As also shown, portions of the caliper bracket 318 can be directly secured to portions of the support brackets 320 with bolts 311*a* at positions around and/or proximate to the steering knuckle 114 (such as at positions around and/or proximate to the first lug 114*c* and/or the second lug 114*b* (see FIGS. 9-10). FIG. 8 illustrates a view of an inward-facing side of the assembly 300 (i.e., a side of the assembly 300 facing towards the vehicle). FIG. 8 shows brake caliper 316, caliper brackets 318, support brackets 320, bolts 311*a*, 311*b*, and steering knuckle 114 alongside rotor 310 and hub/bearing assembly 112. FIGS. 9-10 illustrate brake caliper 316, caliper brackets 318, support brackets 320, bolts 311*a*, 311*b*, and steering knuckle 114 alone for clarity.

As shown in FIGS. 9-10 and discussed previously with respect to FIG. 2A, the steering knuckle 114 can have a spindle 115 extending generally perpendicularly from a main body 114*a* of the steering knuckle 114 (and away from the vehicle). The spindle 115 can insert through hub/bearing assembly 112. The hub/bearing assembly 112 can include studs which can pass through holes in a wheel (not shown) and be secured to the wheel as is known to one of ordinary skill in the art. Although not shown, the brake caliper 316 can house and/or hold brake pads which can contact and engage surfaces of the rotor 310. As discussed previously, steering knuckle 114 can have one or more lugs that allow the brake caliper 316 to be secured thereto, such as a first lug 114*c* and a second lug 114*b*. As shown, the first lug 114*c* can be vertically higher than the second lug 114*b* (with respect to the orientation of the brake assembly 100 shown in FIG. 1).

Brake caliper 316 can have one or more holes 317 extending therethrough in a direction generally parallel to an inward-surface of rotor 310 (see FIG. 8). For example, brake caliper 316 can include two holes 317 on an inward portion of the brake caliper 316 which is oriented adjacent the inward-surface of the rotor 310 when the brake caliper 316 straddles the rotor 310. One of the two holes 317 on the inward portion of the brake caliper 316 can be near a top end of the brake caliper 316 (with reference to the orientation shown in FIG. 8) and one of the two holes 317 on the inward portion can be near a bottom end of the brake caliper (with reference to the orientation shown in FIG. 8). The one or more holes 317 of brake caliper 316 can be threaded and can be sized and shaped to receive a fastener, such as a threaded bolt. The fastener can secure to the one or more holes 317 and can secure to an end of the caliper bracket 318 which can also have a hole that is threaded and/or sized and shaped to receive the fastener (such as end 340 as shown in FIG. 12).

Figure 11:
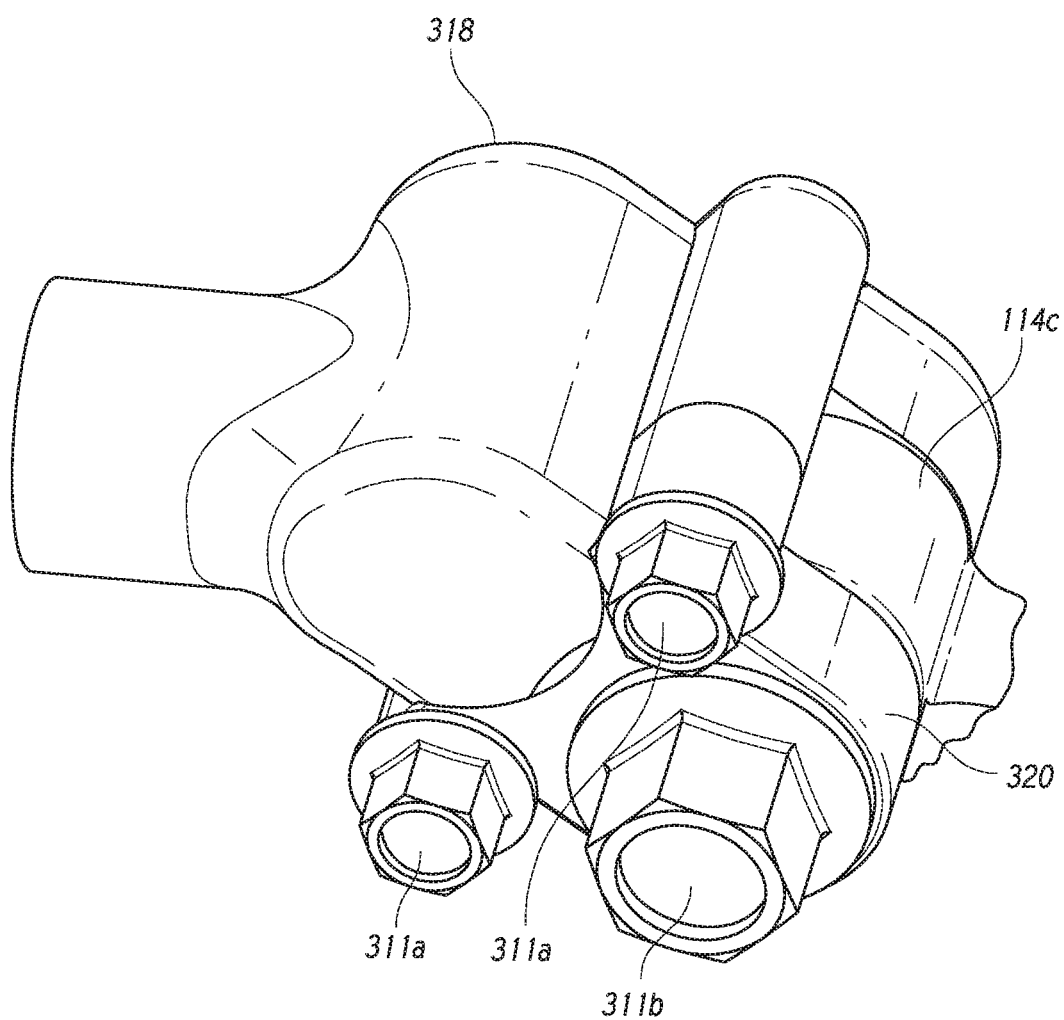
FIG. 11 illustrates a perspective view of a portion of the radial-mount brake assembly of FIG. 8.

As shown in FIGS. 8-10, brake caliper 316 can be mounted to steering knuckle 114 with the utilization of caliper brackets, such as caliper brackets 318, support brackets 320, and bolts (such as bolts 311*a*, 311*b*). FIG. 11 illustrates an enlarged view of caliper bracket 318, support bracket 320, and bolts 311*a*, 311*b* without additional components shown in FIGS. 8-10. FIG. 12 shows an enlarged view of caliper bracket 318. As shown, caliper bracket 318 includes a first end 340 and a second end 344. The first end 340 can secure to a portion of the brake caliper 318, as discussed above. For example, caliper bracket 318 can include a stem 344 that can be cylindrical and can define an opening. The opening can be sized and shaped to receive a fastener. As discussed above, such fastener can be secured to the first end 340 of caliper bracket 318 and to a portion of the brake caliper 316 (such as to hole 317). The stem 344 of the caliper bracket 318 can be threaded. The stem 344 can extend from the first end 340 of the caliper bracket 318 and terminate at an elbow portion 346. Caliper bracket 318 can include side portions 347a, 347b which extend outward from the caliper bracket 318 adjacent to elbow portion 346. Side portions 347a, 347b can be configured to secure directly to portions of the support brackets 320. Side portions 347a, 347b can have a partially cylindrical cross section, as shown in at least FIG. 12. The caliper bracket 318 can include recessed faces at the second end 344 which are recessed from an inward face 346a of the elbow portion 346. For example, side portions 347a, 347b of caliper bracket 318 can include recessed faces 348a, 348b which are recessed from inward face 346a a distance equal to a thickness of ear portions 362 and 364 of support bracket 320.

As discussed above, portions of the support bracket 320 can directly secure to portions of the caliper bracket 318. As shown in FIGS. 11-14, ear portions 362, 364 can abut recessed faces 348a, 348b when secured directly thereto with bolts 311a which can pass through holes 362a, 364a of ear portions 362, 364 and thread into threaded holes 350a, 350b which can extend within a length of side portions 347a, 347b. The size, shape, orientation, and/or recess thickness of recessed faces 348a, 348b of caliper bracket 318 can be equal to the size, shape, orientation, and/or thickness of ear portions 362, 364 of support bracket 320. Elbow portion 346 of caliper bracket 318 can have curved sides 346b which can be sized and shaped to accommodate and/or abut curved top portion 365 which extends between ear portions 362, 364 of support bracket 320. As shown in FIG. 12, portions 349 of the perimeters of side portions 347a, 347b can be curved to accommodate the curvature of first and second lugs 114c, 114b when the caliper bracket 318 abuts and is secured to the first and second lugs 114c, 114b of the steering knuckle 114.

Figure 12:
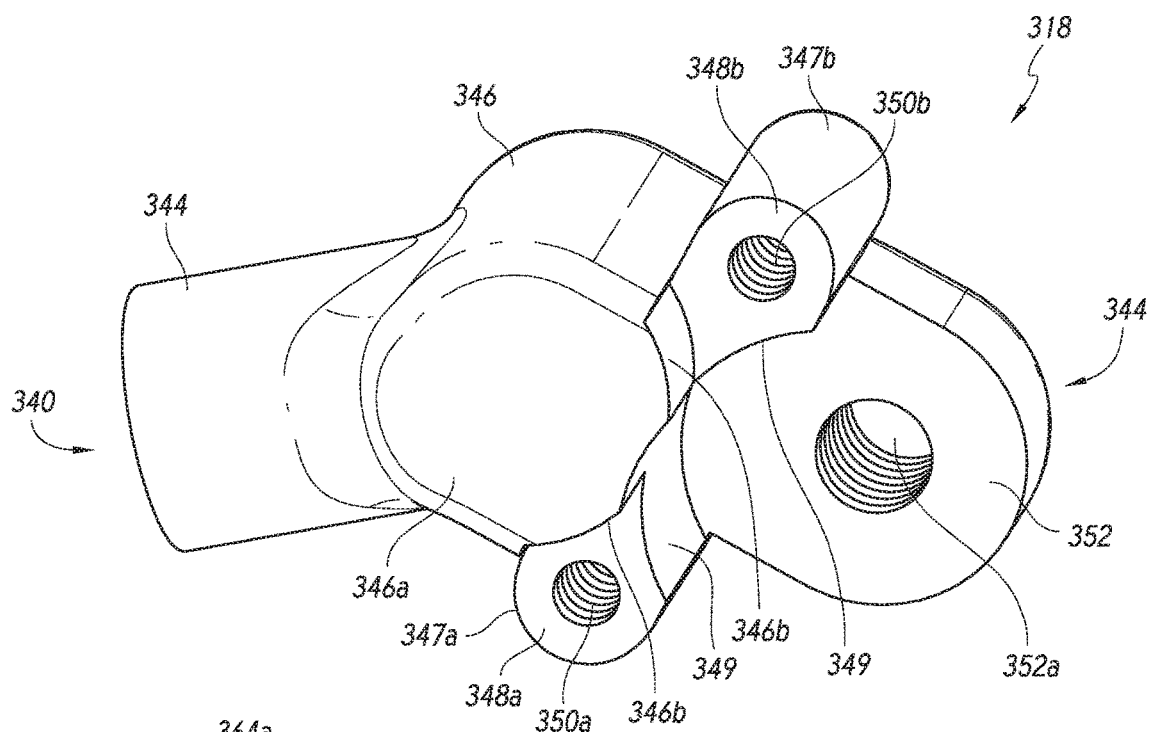
FIG. 12 illustrates a perspective view of the caliper bracket of FIG. 11.

Recessed face 352 of caliper bracket 318 can be recessed from inward side 346a of the elbow portion 346 of caliper bracket 318 a greater amount than the recessed faces 348a, 348b so as to accommodate the first or second lug 114c, 114b when secured thereto (see FIGS. 12 and 10). In some embodiments, the recessed face 352 can be recessed from recessed faces 348a, 348b a thickness equal to the thickness of the first or second lug 114c, 114b (for example, thickness T2 as shown in FIG. 2B). Recessed face 352 can be sized, shaped, and/or oriented to accommodate and secure to first or second lug 114c, 114b. Recessed face 352 (and/or second end 344) can be rounded along a perimeter in a similar manner as the rounded perimeter of the cylindrical-shaped lug 114c, 114b (see FIGS. 12 and 10). Recessed face 352 can abut an outward-facing surface of the first or second lugs 114c, 114b when the caliper bracket 318 is secured to the steering knuckle 114. Recessed face 352 can include a hole 352a that is sized and shaped to receive a fastener, such as bolt 311b. When the caliper bracket 318 is secured to the first or second lug 114c, 114b, bolt 311b can pass through a hole in the first or second lug 114c, 114b, and secure to hole 352a of the recessed face 352 (which can be threaded as shown in FIG. 12). Additionally, hole 352a can align with hole 360a in body portion 360 of support bracket 320 when the support bracket 320 is secured to the caliper bracket 318 and/or the first or second lug 114c, 114b, as shown in FIG. 11. Recessed face 352 can be sized, shaped, and/or oriented similar to the size, shape, and/or orientation of body portion 360 of support bracket 320.

Figure 13:
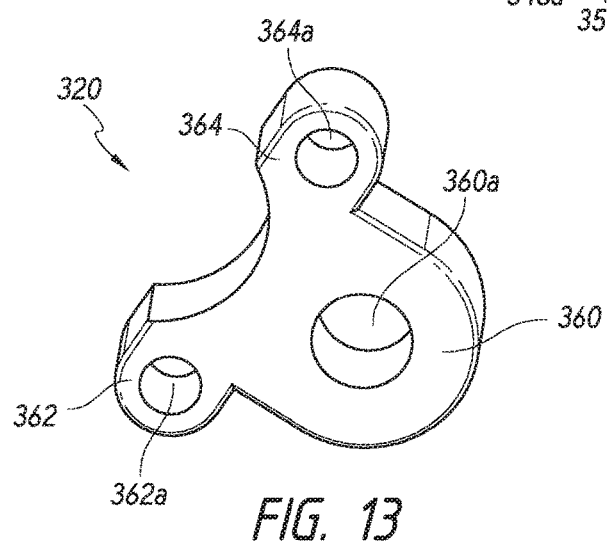
FIG. 13 illustrates a perspective view of the support bracket of FIG. 11.
Figure 14:
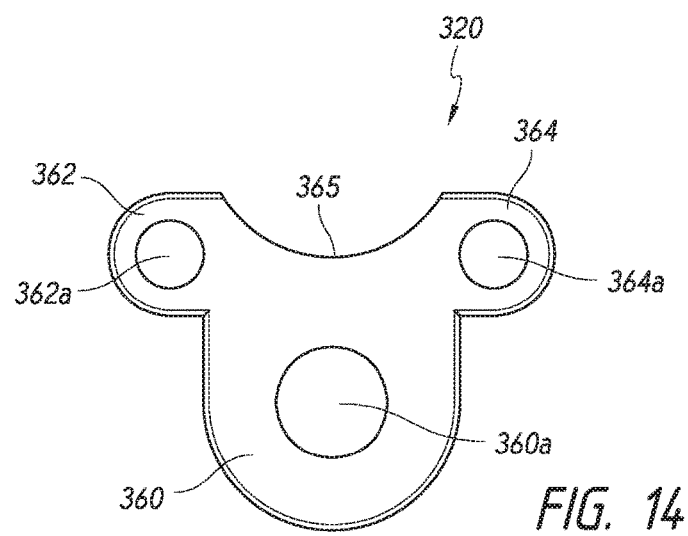
FIG. 14 illustrates a side view of the support bracket of FIG. 11.

As shown by FIGS. 13-14, support bracket 320 can include body portion 360 and ear portions 362, 364 which extend outward from the body portion 360. The support bracket 320 can have a partially T-shaped cross section (see FIG. 14), wherein ear portions 362, 364 extend outward from body portion 360 at right and left branches. Support bracket 320 can have a curved top portion 365 between the ear portions 362, 364. As discussed above, curved top portion 365 can be sized and shaped to accommodate and/or abut curved sides 346b of the elbow portion 346 of caliper bracket 318 when the support bracket 320 is secured to the caliper bracket 318. Body portion 360 can have a hole 360a which aligns with hole 352a in the caliper bracket 318 and a hole in the first or second lug 114c, 114b so that a fastener (such as bolt 311b) can secure the support bracket 320 and caliper bracket 318 to the first or second lug 114c, 114b.

As shown in FIGS. 8-14, the structure, shape, and configuration of the caliper bracket 318 and support bracket 320 allow the two components to secure inward and outward faces of the first and second lug 114c, 114b, of the steering knuckle 114. When the caliper bracket 318 is secured to the first or second lug 114c, 114b of the steering arm 114, the recessed face 352 of the caliper bracket 318 abuts an outward face of the first or second lug 114c, 114b. Further, when the support bracket 320 is secured to the first or second lug 114c, 114b, an outward face of the support bracket 320 abuts an inward face of the first or second lug 114c, 114b of the steering knuckle 114. Thus, when secured to the first or second lug 114c, 114b of the steering knuckle 114, the caliper bracket 318 and the support bracket 320 straddle opposite sides of the first or second lug 114c, 114b. Additionally, the support bracket 320 and caliper bracket 318 are directly secured to each other via the ear portions 362, 364 and side portions 347a, 347b, whereby outward faces of the ear portions 362, 364 abut the recessed faces 348a, 348b. If caliper bracket 318 is used by itself in such securement configuration, the brake caliper 316 may undesirably flex or bend about the point where the caliper bracket 318 and the first or second lug 114c, 114b connect as a result of the force from engagement of the brake pads on the rotor 310 (in a direction generally perpendicular to a surface of the rotor 310). Such bending or flexure of the brake caliper 316 can cause uneven engagement of the brake pads of the brake caliper 316 on the rotor 310 and/or uneven distributions of heat along the brake pad-rotor interface, which can in turn cause uneven break wear. The utilization of support bracket 320 can advantageously reduce or eliminate such issues. Further, the support bracket 320 increases the overall rigidity of the radial-mount brake caliper-steering knuckle interface which can increase sensitivity and precision in braking. As discussed above with reference to the axial-mount brake assembly 100, such increased braking sensitivity can be significantly valuable in competitive driving environments, for example.

From the foregoing description, it will be appreciated that inventive brake caliper mounting assemblies are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. An assembly for an axial brake mount for an automobile, the assembly comprising:
   a steering knuckle comprising a first lug and a second lug;
   a brake caliper;
   a caliper bracket configured to at least partially secure the steering knuckle to the brake caliper, the caliper bracket comprising:
      a top portion, having a first end configured to secure to an outward side of the first lug and a second end configured to secure to an outward side of the first portion of the brake caliper;
      a bottom portion, having a first end configured to secure to an outward side of the second lug and a second end configured to secure to an outward side of the second portion of the brake caliper; and
      a stem extending between the top and bottom portions, the stem configured to stabilize the top and bottom portions of the caliper bracket;
   a first support bracket comprising a first end and a second end, the first end configured to secure to an inward side of the first lug of the steering knuckle and the second end configured to secure to an inward side of the first portion of the brake caliper; and
   a second support bracket comprising a first end and a second end, the first end configured to secure to an inward side of the second lug of the steering knuckle and the second end configured to secure to an inward side of the second portion of the brake caliper.

2. The assembly of claim 1, wherein, when the caliper bracket and the first and second support brackets are secured to the steering knuckle and the brake caliper:
   an inward face of the first end of the top portion of the caliper bracket abuts the outward side of the first lug of the steering knuckle and an inward face of the second end of the top portion abuts the outward side of the first portion of the brake caliper;
   an inward face of the first end of the bottom portion of the caliper bracket abuts the outward side of the second lug of the steering knuckle and an inward face of the second end of the bottom portion abuts the outward side of the second portion of the brake caliper;
   an outward face of the first end of the first support bracket abuts the inward side of the first lug of the steering knuckle and an outward face of the second end of the first support bracket abuts the inward side of the first portion of the brake caliper;
   an outward face of the first end of the second support bracket abuts the inward side of the second lug of the steering knuckle and an outward face of the second end of the second support bracket abuts the inward side of the second lug of the second portion of the brake caliper.

3. The assembly of claim 2, wherein:
the first end of the top portion of the caliper bracket has a first thickness;
the first lug of the steering knuckle has a second thickness;
the first end of the first support bracket has a third thickness;
the second end of the top portion of the caliper bracket has a fourth thickness;
the first portion of the brake caliper has a fifth thickness; and
the second end of the first support bracket has a sixth thickness;
and wherein a sum of the first, second, and third thicknesses is within 15% of a sum of the fourth, fifth, and six thicknesses.

4. The assembly of claim 3, wherein the sum of the first, second, and third thicknesses is within 10% of the sum of the fourth, fifth, and six thicknesses.

5. The assembly of claim 3, wherein the first thickness of the first end of the top portion of the caliper bracket is greater than the fourth thickness of the second end of the top portion of the caliper bracket.

6. The assembly of claim 3, wherein the third thickness of the first end of the first support bracket is greater than the sixth thickness of the second end of the first support bracket.

7. The assembly of claim 3, wherein:
the first end of the bottom portion of the caliper bracket has a seventh thickness;
the second lug of the steering knuckle has an eighth thickness;
the first end of the second support bracket has a ninth thickness;
the second end of the bottom portion of the caliper bracket has a tenth thickness;
the second portion of the brake caliper has a eleventh thickness; and
the second end of the first support bracket has a twelfth thickness;
and wherein a sum of the seventh, eighth, and ninth thicknesses is within 15% of a sum of the tenth, eleventh, and twelfth thicknesses.

8. The assembly of claim 7, wherein the sum of the seventh, eighth, and ninth thicknesses is within 10% of the sum of the tenth, eleventh, and twelfth thicknesses.

9. The assembly of claim 7, wherein the seventh thickness of the first end of the bottom portion is less than the tenth thickness of the second end of the bottom portion.

10. The assembly of claim 9, wherein the ninth thickness of the first end of the second support bracket is less than the twelfth thickness of the second end of the support bracket.

11. The assembly of claim 1, wherein:
the first portion of the brake caliper has a through-hole and the second portion of the brake caliper has a through-hole;
the first lug of the steering knuckle has a through-hole and the second lug of the steering knuckle has a through-hole;
the first end of the top portion has a through-hole aligned with the through-hole of the first lug of the steering knuckle and the second end of the top portion of the caliper bracket has a through-hole aligned with the through-hole of the first portion of the brake caliper;
the first end of the first support bracket has a through-hole aligned with the through-hole of the first lug of the steering knuckle and the second end of the first support bracket has a through-hole aligned with the through-hole of the first portion of the brake caliper;
a first bolt extends through the through-hole of the first end of the top portion of the caliper bracket, the through-hole of the first lug of the steering knuckle, and the through-hole of the first end of the first support bracket; and
a second bolt extends through the through-hole of the second end of the top portion of the caliper bracket, the through-hole of the first portion of the brake caliper, and the through-hole of the second end of the first connectorsupport bracket;
wherein the first and second bolts cooperate to straddle the first portion of the brake caliper and the first lug of the steering knuckle to reduce stresses arising from the brake caliper moving in a direction away from a rotor of the automobile.

12. The assembly of claim 11, wherein an opening is defined between the top portion of the caliper bracket, the first support bracket, the first portion of the brake caliper, and the first lug of the steering knuckle.

13. The assembly of claim 11, wherein:
the first end of the bottom portion has a through-hole aligned with the through-hole of the second lug of the steering knuckle and the second end of the bottom portion of the caliper bracket has a through-hole aligned with the through-hole of the second portion of the brake caliper;
the first end of the second support bracket has a through-hole aligned with the through-hole of the second lug of the steering knuckle and the second end of the second support bracket has a through-hole aligned with the through-hole of the second portion of the brake caliper;
a third bolt extends through the through-hole of the first end of the bottom portion of the caliper bracket, the through-hole of the second lug of the steering knuckle, and the through-hole of the first end of the second support bracket; and
a fourth bolt extends through the through-hole of the second end of the bottom portion of the caliper bracket, the through-hole of the second portion of the brake caliper, and the through-hole of the second end of the second support bracketconnector.

14. The assembly of claim 13, wherein an opening is defined between the bottom portion of the caliper bracket, the second support bracket, the second portion of the brake caliper, and the second lug of the steering knuckle.

15. The assembly of claim 1, wherein the stem of the caliper bracket is curved away from the steering knuckle.

16. The assembly of claim 1, wherein the first and second portions of the brake caliper are positioned closer to a rotor of the automobile than the first and second lugs of the steering knuckle so as to allow one or more brake pads housed within the brake caliper to contact a surface of the rotor.

17. A method of stiffening a brake assembly for an automobile, the method comprising:
providing a steering knuckle comprising a first lug and a second lug;
providing a brake caliper;
positioning a first portion of a first bracket proximate to a first portion of the brake caliper and positioning a second portion of the first bracket adjacent to the first lug of the steering knuckle so that an inward face of the second portion of the first bracket abuts an outward side of the first lug; and positioning a first portion of a first support bracket adjacent to the first lug of the steering knuckle so that an outward face of the first portion of the first support bracket abuts an inward side of the first lug;

inserting a first fastener through:
- a hole in the first portion of the first support bracket;
- a hole in the first lug of the steering knuckle; and
- a hole in the second portion of the first bracket, wherein the first bracket comprises an I-shaped caliper bracket having a top portion, a bottom portion, and a stem extending between the top and bottom portions, the first portion of the first bracket comprising a first end of the top portion and the second portion of the first bracket comprising a second end of the top portion;

securing the first end of the top portion to the first portion of the brake caliper so that an inward face of the first end of the top portion abuts an outward face of the first portion of the brake caliper, the first portion of the brake caliper comprising a through-hole configured to align with a through-hole in the first end of the top portion;

and wherein the method further comprises securing a second portion of the first support bracket to the first portion of the brake caliper so that an outward face of the second portion of the first support bracket abuts an inward face of the first portion of the brake caliper, the second portion of the first support bracket comprising a through-hole configured to align with the through-hole in the first portion of the brake caliper;

wherein, when the first end of the top portion is secured to the first portion of the brake caliper and the second portion of the first support bracket is secured to the first portion of the brake caliper, a second fastener extends through:

the through-hole in the first end of the top portion;

the through-hole of the first portion of the brake caliper; and the through-hole in the second portion of the first support bracket.

* * * * *

UNITED STATES PATENT AND TRADEMARK OFFICE
CERTIFICATE OF CORRECTION

PATENT NO. : 10,900,529 B2
APPLICATION NO. : 16/386076
DATED : January 26, 2021
INVENTOR(S) : Emilio Cervantes Page 1 of 1

It is certified that error appears in the above-identified patent and that said Letters Patent is hereby corrected as shown below:

In the Claims

In Column 16, Line 13, Claim 11, delete "connectorsupport" and insert --support--.

In Column 16, Line 44, Claim 13, delete "bracketconnector." and insert --bracket.--.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*